United States Patent
Tan

(10) Patent No.: US 11,211,973 B2
(45) Date of Patent: Dec. 28, 2021

(54) PROCESSING METHOD AND LED MODULE BASED ON POWER LINE TRANSMISSION AMPLITUDE-MODULATED SIGNAL

(71) Applicant: JIANGMEN PENGJIANG TIANLI NEW TECH CO., LTD., Jiangmen (CN)

(72) Inventor: Yanying Tan, Jiangmen (CN)

(73) Assignee: JIANGMEN PENGJIANG TIANLI NEW TECH CO., LTD., Jiangmen (CN)

( * ) Notice: Subject to any disclaimer, the term of this patent is extended or adjusted under 35 U.S.C. 154(b) by 0 days.

(21) Appl. No.: 16/896,253

(22) Filed: Jun. 9, 2020

(65) Prior Publication Data

US 2020/0412411 A1 Dec. 31, 2020

Related U.S. Application Data

(63) Continuation-in-part of application No. PCT/CN2020/086903, filed on Apr. 26, 2020.

(30) Foreign Application Priority Data

Jun. 26, 2019 (CN) .......................... 201910562019.8

(51) Int. Cl.
*H05B 47/185* (2020.01)
*H04B 3/54* (2006.01)
*H05B 45/345* (2020.01)

(52) U.S. Cl.
CPC .......... *H04B 3/548* (2013.01); *H05B 45/345* (2020.01); *H05B 47/185* (2020.01); *H04B 2203/5404* (2013.01); *H04B 2203/547* (2013.01)

(58) Field of Classification Search
CPC ............ H04B 2203/5462; H04B 3/548; H04B 2203/5405; H04B 2203/547; H05B 37/02;
(Continued)

(56) References Cited

U.S. PATENT DOCUMENTS

2007/0040696 A1\* 2/2007 Mubaslat ............... H05B 45/18
340/657
2011/0043124 A1\* 2/2011 Johnston .............. H05B 47/185
315/250

(Continued)

*Primary Examiner* — Dac V Ha

(57) ABSTRACT

A processing method and LED module based on a power line transmission amplitude-modulated signal, which comprises a voltage processing module, a voltage regulator module, a control module, a constant current module, a signal comparison module, an oscillator and an LED, wherein an amplitude-modulated signal having a high and low level is input from a positive electrode terminal and then processed by the voltage processing module for input to the voltage regulator module, a power supply voltage is provided respectively for the LED and the control module under the effect of the voltage regulator module, and a reference voltage is provided for the signal comparison module; the amplitude-modulated signal is input to the signal comparison module, such that a control signal is obtained under the effect of the signal comparison module for input to the control module. In the invention, the LED emits light stably, and can be automatically produced.

10 Claims, 2 Drawing Sheets

(58) Field of Classification Search
CPC ............... H05B 33/08; H05B 33/0815; H05B 33/0842; H05B 45/00; H05B 45/10; H05B 45/345; H05B 47/185
See application file for complete search history.

(56) References Cited

U.S. PATENT DOCUMENTS

| | | | | |
|---|---|---|---|---|
| 2014/0001972 A1* | 1/2014 | Harris | ................... | H05B 47/18 |
| | | | | 315/200 R |
| 2014/0203722 A1* | 7/2014 | Yoon | ..................... | H05B 45/00 |
| | | | | 315/201 |
| 2014/0320031 A1* | 10/2014 | Wu | ........................ | H05B 45/37 |
| | | | | 315/193 |
| 2014/0354180 A1* | 12/2014 | Zhang | ................... | H05B 45/37 |
| | | | | 315/307 |
| 2015/0163879 A1* | 6/2015 | Zheng | ................... | H05B 45/37 |
| | | | | 315/307 |

* cited by examiner

PROCESSING METHOD AND LED MODULE BASED ON POWER LINE TRANSMISSION AMPLITUDE-MODULATED SIGNAL

CROSS REFERENCE OF RELATED APPLICATIONS

The present application is a continuation-in-part of International Patent Application No. PCT/CN2020/086903 filed on Apr. 26, 2020, which claims foreign priorities of Chinese Patent Application No. CN201910562019.8, filed on Jun. 26, 2019, the entire contents of which are hereby incorporated by reference.

TECHNICAL FIELD

The present invention relates to the field of circuits, and in particular to a processing method and LED module based on a power line transmission amplitude-modulated signal.

BACKGROUND ART

In the prior art, there are several methods for controlling the light emission of an LED. One is to carry out independent transmission by means of a signal line and a power line at a transmitting end, with the need of only decoding a control signal at a receiving end, thereby controlling the light emission of the LED under the cooperation of a power supply; this method requires more wires and is inconvenient in installation, thereby increasing the material and labor costs. The other method is to modulate a control signal and a direct-current power supply in a transmitting control system, and to filter a power signal loaded with the control signal in a receiving control system so as to restore the control signal, and in this method, filtration is adopted in the receiving control system, but the receiving system cannot be encapsulated to an LED, making it impossible for the LED to be modularized for automatic production, thereby increasing the processing cost. Still another method is also to modulate a control signal and a power signal, but a low level for modulating the signals is provided by a Zener diode, the current of the Zener diode is small, and the demodulated low-level voltage cannot drive an LED, resulting in light emission unstable.

SUMMARY OF THE INVENTION

The present invention proposes a processing method and LED module based on a power line transmission amplitude-modulated signal, which solve the problem of unstable light emission of a diode in the prior art.

The technical solution of the present invention is implemented as follows:

A processing method based on a power line transmission amplitude-modulated signal is provided, comprising a voltage processing module, a voltage regulator module, a control module, a constant current module, a signal comparison module, an oscillator and an LED, characterized in that an amplitude-modulated signal having a high and low level is input from a positive electrode terminal and then processed by the voltage processing module for input to the voltage regulator module; a power supply voltage is provided respectively for the LED and the control module under the effect of the voltage regulator module, and a reference voltage is provided for the signal comparison module; at the same time, the amplitude-modulated signal is input to the signal comparison module, such that a control signal is obtained under the effect of the signal comparison module for input to the control module; the control module outputs, under the effect of the control signal, a drive signal to adjust the current of the constant current module, so as to control the change of light emission of the LED, and one end of the control module is connected to the oscillator;

when the amplitude-modulated signal input from the positive electrode terminal is at a high level:

the amplitude-modulated signal is processed by the voltage processing module for input to the voltage regulator module, such that the voltage regulator module can provide a power supply voltage for normal operating of the LED and the control module, and provide a reference voltage for the signal comparison module; the amplitude-modulated signal of the high level is processed by the signal comparison module for input to the control module as a control signal of a high level;

when there is a difference between voltages at the low level and high level of the amplitude-modulated signal input from the positive electrode terminal and the low level is not 0 V:

if the low-level voltage can ensure normal operating of the LED and the control module, the amplitude-modulated signal is processed by the voltage processing module for input to the voltage regulator module, such that the voltage regulator module can provide a power supply voltage for normal operating of the LED and the control module so as to ensure that the LED and the control module can maintain a stable operating state when the amplitude-modulated signal is at the low level, and provide a reference voltage for the signal comparison module; at the same time, the amplitude-modulated signal of the low level is processed by the signal comparison module for input to the control module as a control signal of a low level;

if the low-level voltage can only ensure normal operating of the control module but cannot ensure normal operating of the LED, the amplitude-modulated signal is processed by the voltage processing module for input to the voltage regulator module, such that the voltage regulator module can only provide a power supply voltage for normal operating of the control module so as to ensure that the control module can maintain a stable operating state when the amplitude-modulated signal is at the low level, and provide a reference voltage for the signal comparison module; at the same time, the amplitude-modulated signal of the low level is processed by the signal comparison module for input to the control module as a control signal of a low level;

when the low level of the amplitude-modulated signal input from the positive electrode terminal is 0 V:

neither the voltage processing module nor the voltage regulator module can operate normally, but the operating of the control module is maintained by means of discharge of a capacitor arranged inside the voltage regulator module until the arrival of the next high level, thereby ensuring an operating state of the control module when the low level of the amplitude-modulated signal is 0 V, and at the same time, the low level of 0 V is also the low level of the control signal.

As a preferred embodiment of the present invention, the control module comprises a data receiving unit, a clock data unit, a data processing unit, a control unit and a storage unit, wherein the data receiving unit is connected to the clock data unit and the data processing unit respectively, and the data processing unit is connected to the control unit and the storage unit respectively.

As a preferred embodiment of the present invention, the LED is a single LED lamp or multiple LED lamps.

As a preferred embodiment of the present invention, relevant elements such as a voltage regulator tube, a resistor and a capacitor are disposed inside the voltage regulator module, and are used to provide the operating voltage of the LED and the control module and provide the reference voltage for the signal comparison module.

As a preferred embodiment of the present invention, receiving ends of the voltage processing module and the signal comparison module are connected to a positive electrode.

As a preferred embodiment of the present invention, an output end of the control module is connected to a negative electrode.

An LED module based on a power line transmission amplitude-modulated signal is provided, comprising a voltage processing module, a voltage regulator module, a control module, a constant current module, a signal comparison module and an LED, wherein an amplitude-modulated signal is input at input ends of the voltage processing module and the signal comparison module, an output end of the voltage processing module is connected to an input end of the voltage regulator module, and an output end of the voltage regulator module is connected to the LED, the control module and the signal comparison module respectively to provide a power supply voltage for the LED and the control module and a reference voltage for the signal comparison module; and the control module is connected to the LED via the constant current module, the signal comparison module outputs a control signal to the control module according to the input amplitude-modulated signal, and the control module outputs, under the effect of the control signal, a drive signal to adjust the current of the constant current module, so as to control the change of light emission of the LED.

As a preferred embodiment of the present invention, the control module is further connected to an oscillator.

As a preferred embodiment of the present invention, the control module comprises a data receiving unit, a clock data unit, a data processing unit, a control unit and a storage unit, wherein the data receiving unit is connected to the clock data unit and the data processing unit respectively, and the data processing unit is connected to the control unit and the storage unit respectively.

As a preferred embodiment of the present invention, the module comprises two data lines, wherein one data line is used as a positive electrode input for input of the amplitude-modulated signal, and is connected to the input ends of the voltage processing module and the signal comparison module, with the amplitude-modulated signal including power supply and control signals; and the other data line is used as a negative electrode and connected to the control module.

The beneficial effects of the present invention are as follows:

By processing the high and low levels of the amplitude-modulated signal, the LED emits light stably, and can be automatically produced to save the processing cost.

BRIEF DESCRIPTION OF THE DRAWINGS

In order to describe the technical solution in embodiments of the present invention or the prior art more clearly, the drawings which need to be used in the description of the embodiments or the prior art will be simply introduced below. Obviously, the accompanying drawings in the following description show merely some embodiments of the present invention, and those of ordinary skill in the art may still derive other drawings according to these drawings without creative efforts.

In the figures, 1—Voltage processing module; 2—Voltage regulator module; 3—Control module; 31—Data receiving unit; 32—Clock data unit; 33—Data processing unit; 34—Control unit; 35—Storage unit; 4—Constant current module; 5—Signal comparison module; 6—Oscillator; and 7—LED.

DETAILED DESCRIPTION OF EMBODIMENTS

The technical solution in the embodiments of the present invention will be clearly and completely described below in conjunction with the accompanying drawings for the embodiments of the present invention; and obviously, the embodiments described are merely some, rather than all, of the embodiments of the present invention. On the basis of the embodiments of the present invention, all the other embodiments obtained by those of ordinary skill in the art without creative efforts shall fall within the scope of protection of the present invention.

Figure 1:
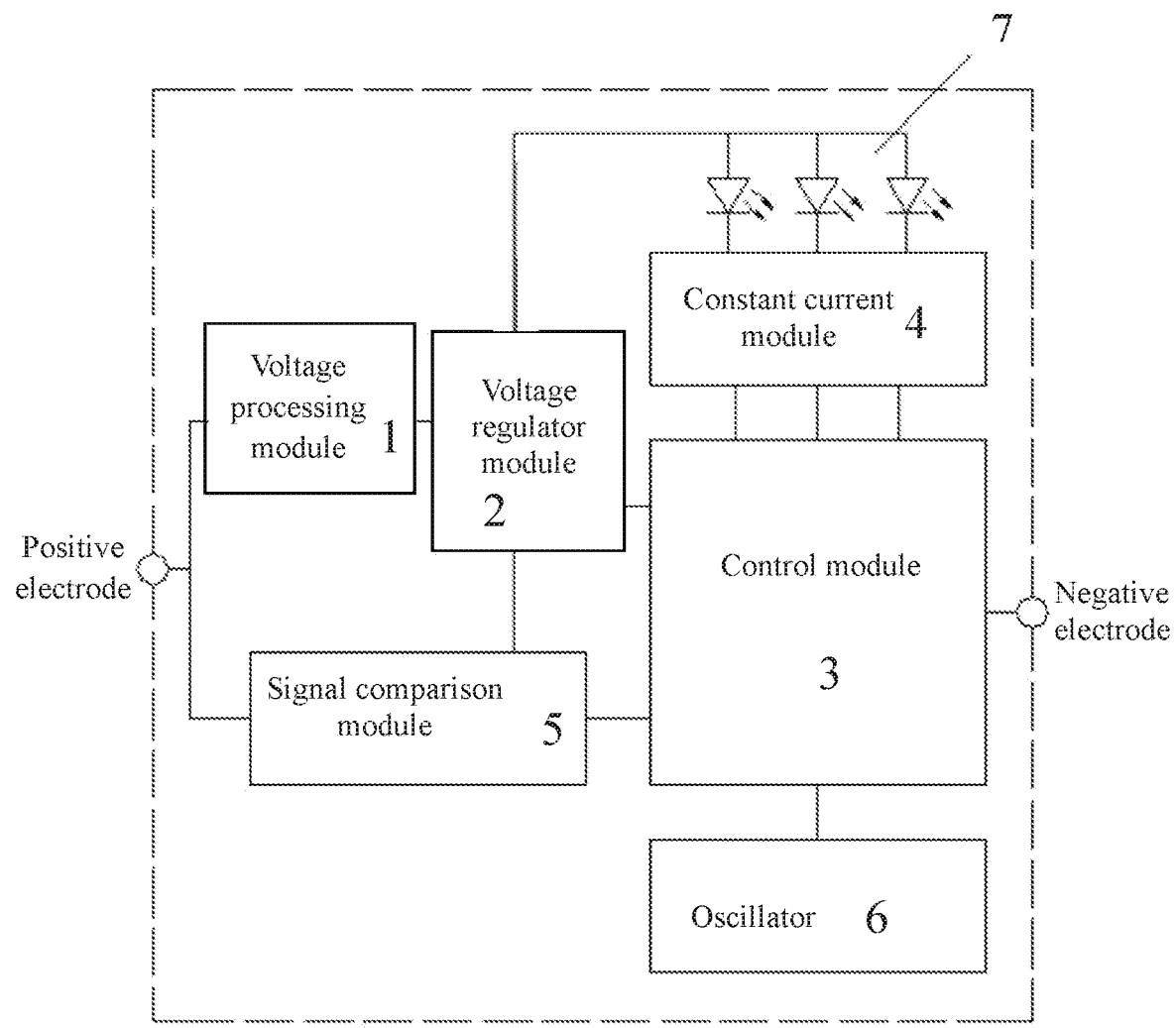
FIG. 1 is a schematic diagram of a planar structure of a processing method and LED module based on a power line transmission amplitude-modulated signal of the present invention.
Figure 2:
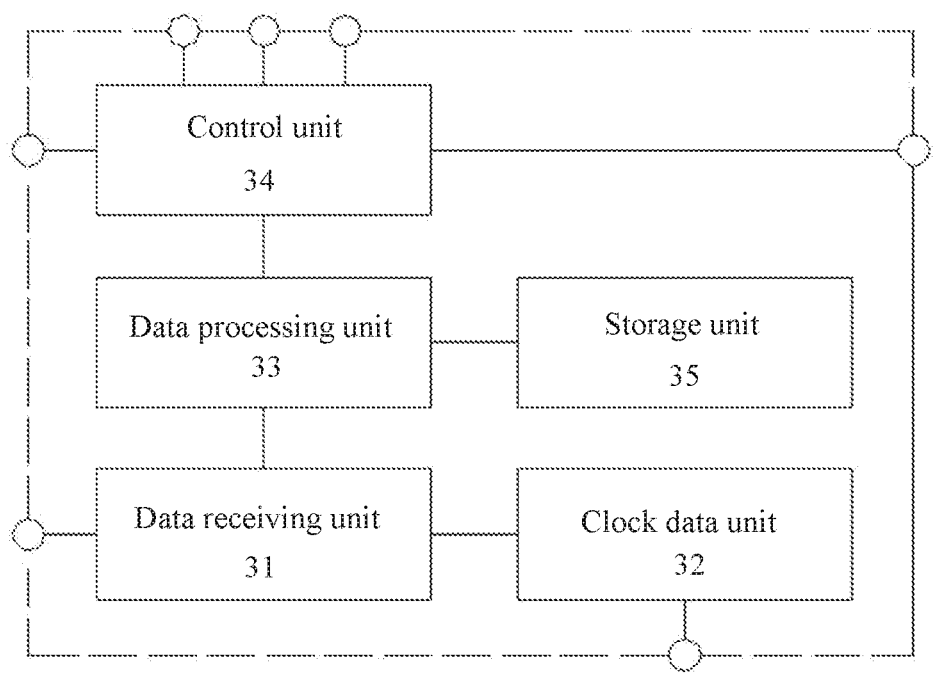
FIG. 2 is a schematic structural diagram of a control module shown in FIG. 1.

As shown in FIGS. 1 and 2, in order to solve the problem of unstable light emission of an LED in an existing circuit for processing a power line transmission signal, the present invention proposes a processing method and LED module based on a power line transmission amplitude-modulated signal, comprising a voltage processing module 1, a voltage regulator module 2, a control module 3, a constant current module 4, a signal comparison module 5, an oscillator 6 and an LED 7, wherein an amplitude-modulated signal having a high and low level is input from a positive electrode terminal and then processed by the voltage processing module 1 for input to the voltage regulator module 2, a power supply voltage is provided respectively for the LED 7 and the control module 3 under the effect of the voltage regulator module 2, and a reference voltage is output to the signal comparison module 5; at the same time, the amplitude-modulated signal is input to the signal comparison module 5, such that a control signal is obtained under the effect of the signal comparison module 5 for input to the control module 3; and one end of the control module 3 is connected to the oscillator 6, and the control module 3 outputs, under the effect of the control signal, a drive signal to adjust the current of the constant current module 4, so as to control the change of light emission of the LED 7. The LED 7 is a single LED lamp or a plurality of LED lamps.

When the amplitude-modulated signal input from the positive electrode terminal is at a high level, the amplitude-modulated signal is processed by the voltage processing module 1 for input to the voltage regulator module 2, such that the voltage regulator module 2 can provide a power supply voltage for normal operating of the LED and the control module 3, and output a reference voltage to the signal comparison module 5; and at the same time, the amplitude-modulated signal of the high level is processed by the signal comparison module 5 for input to the control module 3 as a control signal of a high level.

When there is a difference between voltages at the low level and high level of the amplitude-modulated signal input from the positive electrode terminal and the low level is not 0 V:

if the low-level voltage can ensure normal operating of the LED and the control module 3, the amplitude-modulated signal is processed by the voltage processing module 1 for input to the voltage regulator module 2, such that the voltage regulator module 2 can provide a power supply voltage for normal operating of the LED and the control module 3 so as to ensure that the LED and the control module 3 can maintain a stable operating state when the amplitude-modulated signal is at the low level, and provide a reference voltage for the signal comparison module 5; and at the same time, the amplitude-modulated signal of the low level is processed by the signal comparison module 5 for input to the control module 3 as a control signal of a low level.

If the low-level voltage can only ensure normal operating of the control module 3 but cannot ensure normal operating of the LED, the amplitude-modulated signal is processed by the voltage processing module 1 for input to the voltage regulator module 2, such that the voltage regulator module 2 can only provide a power supply voltage for normal operating of the control module 3 so as to ensure that the control module 3 can maintain a stable operating state when the amplitude-modulated signal is at the low level, and provide a reference voltage for the signal comparison module 5; and at the same time, the amplitude-modulated signal of the low level is processed by the signal comparison module 5 for input to the control module 3 as a control signal of a low level.

A capacitor is disposed inside the voltage regulator module 2; when the low level of the amplitude-modulated signal input from the positive electrode terminal is 0 V, neither the voltage processing module 1 nor the voltage regulator module 2 can operate normally, but the operating of the control module 3 can be maintained by means of discharge of a capacitor arranged inside the voltage regulator module 2 until the arrival of the next high level, thereby ensuring an operating state of the control module 3 when the low level of the amplitude-modulated signal is 0 V, and at the same time, the low level of 0 V is also the low level of the control signal.

The control module 3 comprises a data receiving unit 31, a clock data unit 32, a data processing unit 33, a control unit 34 and a storage unit 35, wherein the data receiving unit 31 is connected to the clock data unit 32 and the data processing unit 33 respectively, and the data processing unit 33 is connected to the control unit 34 and the storage unit 35 respectively.

The data receiving unit 31 in the control module 3 receives, under the cooperation of the clock data unit 32, control data or write address data transmitted by the signal comparison module 5; in addition, the frequency required by the clock data unit 32 is provided by the oscillator 6, and before being used to receive a light emission control signal, the data receiving unit 31 first receives the write address data, and stores, into the storage unit 35, address information obtained after the write address data is processed by the data processing unit 33; and after the data receiving unit 31 receives the light emission control signal, the data processing unit 33 reads control data matching an address in the storage unit 35 and then inputs the control data to the control unit 34.

Relevant elements such as a voltage regulator tube, a resistor and a capacitor are disposed inside the voltage regulator module, and are used to provide the operating voltage of the LED and the control module and provide the reference voltage for the signal comparison module.

The present invention also proposes an LED module based on a power line transmission amplitude-modulated signal, comprising a voltage processing module 1, a voltage regulator module 2, a control module 3, a constant current module 4, a signal comparison module 5 and an LED 7, wherein an amplitude-modulated signal is input at input ends of the voltage processing module 1 and the signal comparison module 5, an output end of the voltage processing module 1 is connected to an input end of the voltage regulator module 2, and an output end of the voltage regulator module 2 is connected to the LED 7, the control module 3 and the signal comparison module 5 respectively to provide a power supply voltage for the LED 7 and the control module 3 and a reference voltage for the signal comparison module 5; and the control module 3 is connected to the LED 7 via the constant current module 4, the signal comparison module 5 outputs a control signal to the control module 3 according to the input amplitude-modulated signal, and the control module 3 outputs, under the effect of the control signal, a drive signal to adjust the current of the constant current module 4, so as to control the change of light emission of the LED 7. The control module 3 is further connected to an oscillator 6.

The control module 3 comprises a data receiving unit 31, a clock data unit a data processing unit 33, a control unit 34 and a storage unit 35, wherein the data receiving unit 31 is connected to the clock data unit 32 and the data processing unit 33 respectively, and the data processing unit 33 is connected to the control unit 34 and the storage unit 35 respectively.

The module comprises two data lines, wherein one data line is used as a positive electrode input for input of the amplitude-modulated signal, and is connected to the input ends of the voltage processing module 1 and the signal comparison module 5, with the amplitude-modulated signal including power supply and control signals; and the other data line is used as a negative electrode and connected to the control module 3.

The present invention uses only two data lines to simultaneously transmit power and control signals so as to power and control an LED.

The above descriptions are merely preferred embodiments of the present invention but not intended to limit the present invention, and any modifications, equivalent replacements, improvements, etc. made within the spirit and principle of the present invention should be included within the scope of protection of the present invention.

What is claimed is:

1. A processing method based on a power line transmission amplitude-modulated signal, comprising a voltage processing module, a voltage regulator module, a control module, a constant current module, a signal comparison module, an oscillator and a light emitting diode (LED), wherein, an amplitude-modulated signal having a high and low level is input from a positive electrode terminal and then processed by the voltage processing module for input to the voltage regulator module; a power supply voltage is provided respectively for the LED and the control module under the effect of the voltage regulator module, and a reference voltage is provided for the signal comparison module; at the same time, the amplitude-modulated signal is input to the signal comparison module, such that a control signal is obtained under the effect of the signal comparison module for input to the control module; the control module outputs, under the effect of the control signal, a drive signal to adjust the current of the constant current module, so as to control the change of light emission of the LED, and one end of the control module is connected to the oscillator;

when the amplitude-modulated signal input from the positive electrode terminal is at a high level:

the amplitude-modulated signal is processed by the voltage processing module for input to the voltage regulator module, such that the voltage regulator module can provide a power supply voltage for normal operating of the LED and the control module, and provide a reference voltage for the signal comparison module; the amplitude-modulated signal of the high level is processed by the signal comparison module for input to the control module as a control signal of a high level;

when there is a difference between voltages at the low level and high level of the amplitude-modulated signal input from the positive electrode terminal and the low level is not 0 V:

if the low-level voltage can ensure normal operating of the LED and the control module, the amplitude-modulated signal is processed by the voltage processing module for input to the voltage regulator module, such that the voltage regulator module can provide a power supply voltage for normal operating of the LED and the control module so as to ensure that the LED and the control module can maintain a stable operating state when the amplitude-modulated signal is at the low level, and provide a reference voltage for the signal comparison module; at the same time, the amplitude-modulated signal of the low level is processed by the signal comparison module for input to the control module as a control signal of a low level;

if the low-level voltage can only ensure normal operating of the control module but cannot ensure normal operating of the LED, the amplitude-modulated signal is processed by the voltage processing module for input to the voltage regulator module, such that the voltage regulator module can only provide a power supply voltage for normal operating of the control module so as to ensure that the control module can maintain a stable operating state when the amplitude-modulated signal is at the low level, and provide a reference voltage for the signal comparison module; at the same time, the amplitude-modulated signal of the low level is processed by the signal comparison module for input to the control module as a control signal of a low level;

when the low level of the amplitude-modulated signal input from the positive electrode terminal is 0 V:

neither the voltage processing module nor the voltage regulator module can operate normally, but the operating of the control module is maintained by means of discharge of a capacitor arranged inside the voltage regulator module until the arrival of the next high level, thereby ensuring an operating state of the control module when the low level of the amplitude-modulated signal is 0 V, and at the same time, the low level of 0 V is also the low level of the control signal.

2. The processing method based on the power line transmission amplitude-modulated signal according to claim 1, wherein the control module comprises a data receiving unit, a clock data unit, a data processing unit, a control unit and a storage unit, wherein the data receiving unit is connected to the clock data unit and the data processing unit respectively, and the data processing unit is connected to the control unit and the storage unit respectively.

3. The processing method based on the power line transmission amplitude-modulated signal according to claim 1, wherein the LED is a single LED lamp or multiple LED lamps.

4. The processing method based on the power line transmission amplitude-modulated signal according to claim 1, wherein relevant elements such as a voltage regulator tube, a resistor and a capacitor are disposed inside the voltage regulator module, and are used to provide the operating voltage of the LED and the control module and provide the reference voltage for the signal comparison module.

5. The processing method based on the power line transmission amplitude-modulated signal according to claim 1, wherein that receiving ends of the voltage processing module and the signal comparison module are connected to a positive electrode.

6. The processing method based on the power line transmission amplitude-modulated signal according to claim 1, wherein that an output end of the control module is connected to a negative electrode.

7. An LED module based on a power line transmission amplitude-modulated signal, wherein comprising a voltage processing module, a voltage regulator module, a control module, a constant current module, a signal comparison module and a light emitting diode (LED), wherein an amplitude-modulated signal is input at input ends of the voltage processing module and the signal comparison module, an output end of the voltage processing module is connected to an input end of the voltage regulator module, and an output end of the voltage regulator module is connected to the LED, the control module and the signal comparison module respectively to provide a power supply voltage for the LED and the control module and a reference voltage for the signal comparison module; and the control module is connected to the LED via the constant current module, the signal comparison module outputs a control signal to the control module according to the input amplitude-modulated signal, and the control module outputs, under the effect of the control signal, a drive signal to adjust the current of the constant current module, so as to control the change of light emission of the LED; the control module comprises a data receiving unit, a clock data unit, a data processing unit, a control unit and a storage unit, wherein the data receiving unit is connected to the clock data unit and the data processing unit respectively, and the data processing unit is connected to the control unit and the storage unit respectively; and the LED module based on the power line transmission amplitude-modulated signal further comprises two data lines, wherein one data line is used as a positive electrode input for input of the amplitude-modulated signal, and is connected to the input ends of the voltage processing module and the signal comparison module, with the amplitude-modulated signal including power supply and control signals; and the other data line is used as a negative electrode and connected to the control module.

8. The LED module based on the power line transmission amplitude-modulated signal according to claim 7, wherein the control module is further connected to an oscillator.

9. The LED module based on the power line transmission amplitude-modulated signal according to claim 8, wherein the control module comprises a data receiving unit, a clock data unit, a data processing unit, a control unit and a storage unit, wherein the data receiving unit is connected to the clock data unit and the data processing unit respectively, and the data processing unit is connected to the control unit and the storage unit respectively.

10. The LED module based on the power line transmission amplitude-modulated signal according to claim 9, wherein comprising two data lines, wherein one data line is used as a positive electrode input for input of the amplitude-modulated signal, and is connected to the input ends of the voltage processing module and the signal comparison module, with the amplitude-modulated signal including power supply and control signals; and the other data line is used as a negative electrode and connected to the control module.

\* \* \* \* \*